(12) United States Patent
Belghoul et al.

(10) Patent No.: US 10,085,176 B2
(45) Date of Patent: Sep. 25, 2018

(54) VIRTUAL WLAN INTERFACE FOR CELLULAR DATA OFFLOADING IN A WIRELESS DEVICE

(71) Applicant: Apple Inc., Cupertino, CA (US)

(72) Inventors: Farouk Belghoul, Campbell, CA (US);
Tarik Tabet, Los Gatos, CA (US);
Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/584,433

(22) Filed: May 2, 2017

(65) Prior Publication Data
US 2017/0238210 A1 Aug. 17, 2017

Related U.S. Application Data

(63) Continuation of application No. 14/496,521, filed on Sep. 25, 2014, now Pat. No. 9,648,633.

(60) Provisional application No. 61/920,266, filed on Dec. 23, 2013.

(51) Int. Cl.
| | |
|---|---|
| *H04W 28/08* | (2009.01) |
| *H04W 76/04* | (2009.01) |
| *H04W 76/27* | (2018.01) |
| *H04W 84/12* | (2009.01) |
| *H04W 88/06* | (2009.01) |
| *H04W 92/10* | (2009.01) |

(52) U.S. Cl.
CPC ......... *H04W 28/08* (2013.01); *H04W 76/046* (2013.01); *H04W 76/27* (2018.02); *H04W 84/12* (2013.01); *H04W 88/06* (2013.01); *H04W 92/10* (2013.01)

(58) Field of Classification Search
CPC .... H04W 28/08; H04W 76/046; H04W 84/12
See application file for complete search history.

(56) References Cited

U.S. PATENT DOCUMENTS

| 7,277,434 B2 | 10/2007 | Astarabadi et al. |
| 2003/0202486 A1 | 10/2003 | Anton, Jr. et al. |
| 2004/0047320 A1 | 3/2004 | Eglin |

(Continued)

OTHER PUBLICATIONS

Hakan Coskun et al, "Virtual WLAN: Going Beyond Virtual Access Points", Electronic Communications of the EASST, 2009, 13 pages, vol. 17.

*Primary Examiner* — Siming Liu
(74) *Attorney, Agent, or Firm* — Meyertons Hood Kivlin Kowert & Goetzel, P.C.; Jeffrey C. Hood

(57) ABSTRACT

This disclosure relates to use of WLAN virtual interfaces. According to one embodiment, a wireless device may be capable of using a WLAN chipset for user initiated WLAN communication and for cellular offloading WLAN communication. A separate WLAN virtual interface may be established for each type of WLAN communication, including a first WLAN virtual interface between the WLAN chipset and a WLAN connectivity manager executing on an application processor of the wireless device and a second WLAN virtual interface between the WLAN chipset and a cellular connectivity manager executing on the application processor. The virtual interfaces may each use a different IP address, and may either multiplex data onto a shared RF chain in a time-sharing manner or each be provided with their own RF chain to perform WLAN communication.

20 Claims, 7 Drawing Sheets

(56) References Cited

U.S. PATENT DOCUMENTS

| | | | |
|---|---|---|---|
| 2007/0248056 A1* | 10/2007 | Feng | H04L 61/2015 |
| | | | 370/331 |
| 2009/0323652 A1 | 12/2009 | Chen et al. | |
| 2011/0222523 A1* | 9/2011 | Fu | H04W 36/22 |
| | | | 370/338 |
| 2011/0319073 A1 | 12/2011 | Ekici et al. | |
| 2014/0092828 A1* | 4/2014 | Sirotkin | H04W 52/0258 |
| | | | 370/329 |
| 2014/0204909 A1* | 7/2014 | Cheng | H04W 8/082 |
| | | | 370/331 |
| 2014/0254565 A1 | 9/2014 | Pitchaiah et al. | |

\* cited by examiner

VIRTUAL WLAN INTERFACE FOR CELLULAR DATA OFFLOADING IN A WIRELESS DEVICE

PRIORITY CLAIM

The present application is a continuation of U.S. patent application Ser. No. 14/496,521, entitled "Virtual WLAN Interface for Cellular Data Offloading in a Wireless Device," filed on Sep. 25, 2014, which claims benefit of priority to U.S. Provisional Application No. 61/920,266, entitled "Virtual WLAN Interface for Cellular Data Offloading in a Wireless Device," filed on Dec. 23, 2013, and which are all hereby incorporated by reference in their entirety as though fully and completely set forth herein.

FIELD

The present disclosure relates to wireless devices, and more particularly to a system and method for a wireless device to implement a virtual WLAN interface for cellular/WLAN interworking.

DESCRIPTION OF THE RELATED ART

Wireless communication systems are rapidly growing in usage. Further, wireless communication technology has evolved from voice-only communications to also include the transmission of data, such as Internet and multimedia content. There exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. While some techniques for coordinating between different wireless communication technologies exist, interworking mechanisms are generally not very well developed, and so improvements in the field would be desirable.

SUMMARY

Embodiments are presented herein of, inter alia, a method for a wireless user equipment (UE) device to implement a virtual WLAN interface for cellular-WLAN interworking, and of a device configured to implement the method.

A wireless device may be capable of WLAN communication and cellular communication, such as according to 3GPP wireless communication technologies. With the development of cellular-WLAN offloading techniques (and an increasing number of cellular operator deployed WLAN access points), such a device may have the potential to experience a conflict between cellular WLAN offloading use of its WLAN communication capability (e.g., selection and use of a cellular operator's WLAN access point for cellular offloading) and user initiated use of its WLAN communication capability (e.g., selection and use of a home, corporate, or other user-selected WLAN access point).

In order to avoid being forced to interrupt one such use for the other or deny requested use in order to avoid interrupting an ongoing use, according to the techniques disclosed herein, the wireless device may be configured to establish multiple WLAN virtual interfaces. Thus, one ("default") WLAN virtual interface may be enabled to provide an interface between the WLAN chipset and a WLAN connectivity manager of the device, while another ("cellular-WLAN interworking" or possibly "3GPP") WLAN virtual interface may be enabled to provide an interface between the WLAN chipset and a cellular connectivity manager of the device.

By providing each use with its own virtual interface, usage conflicts may be avoided. For example, depending on the configuration of the wireless device, a time-sharing algorithm can be implemented to allow concurrent WLAN communication by both virtual interfaces using a shared RF chain, or each virtual interface may be provided with the use of its own RF chain when both are active to allow simultaneous WLAN communication by both virtual interfaces. When only one virtual interface is active, the inactive virtual interface may be disabled. In this case, in a shared RF chain configuration, the remaining active virtual interface may have full-time usage of the RF chain; in a multiple RF chain configuration, an unused RF chain may be powered down upon disabling one of the virtual interfaces.

Using the techniques disclosed herein, it may also be possible to provide each WLAN virtual interface to be assigned an IP address. Furthermore, it may be possible for the cellular-WLAN interworking virtual interface to have the same IP address as used by the wireless device for a cellular data connection, which may be important to preserve service continuity for cellular-WLAN offloading.

Note that the techniques described herein may be implemented in and/or used with a number of different types of devices, including but not limited to, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
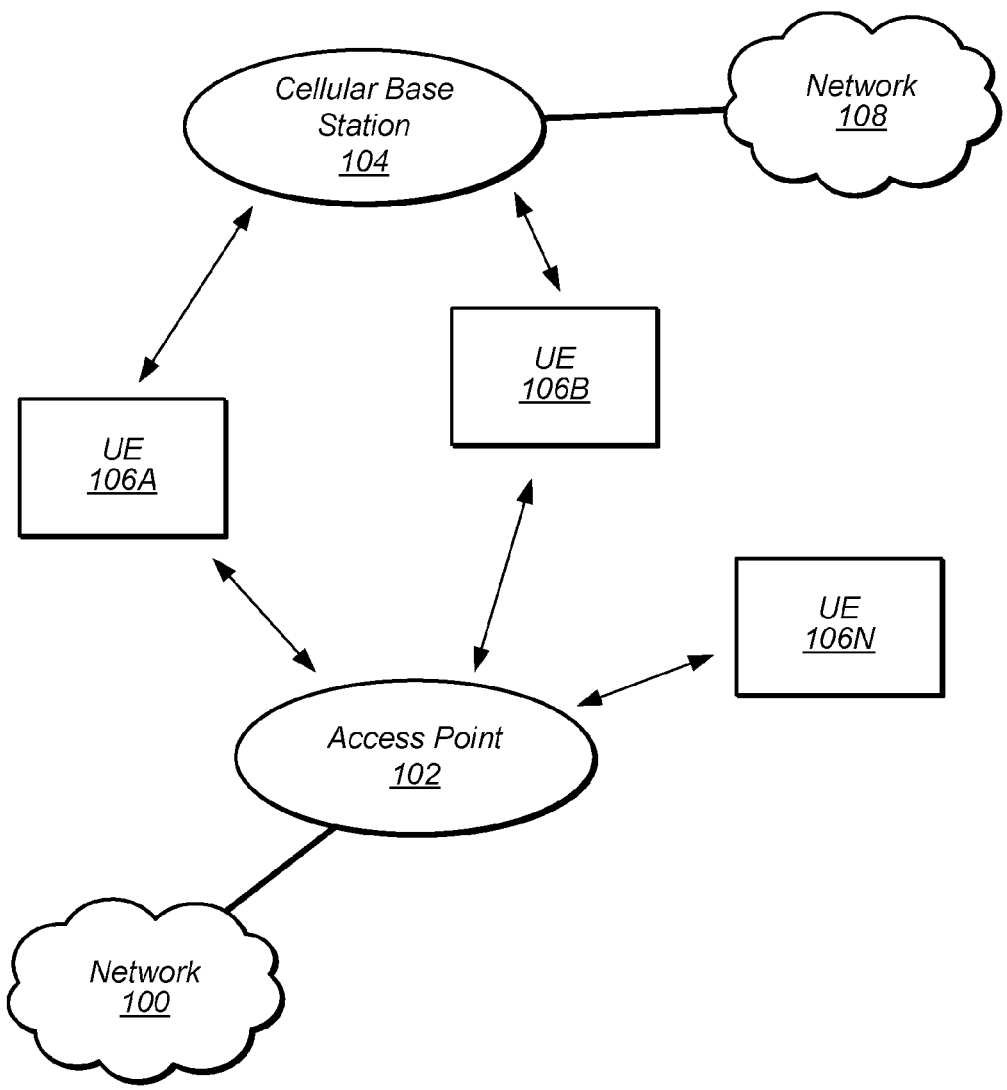
FIG. 1 illustrates an exemplary (and simplified) wireless communication system, according to one embodiment.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
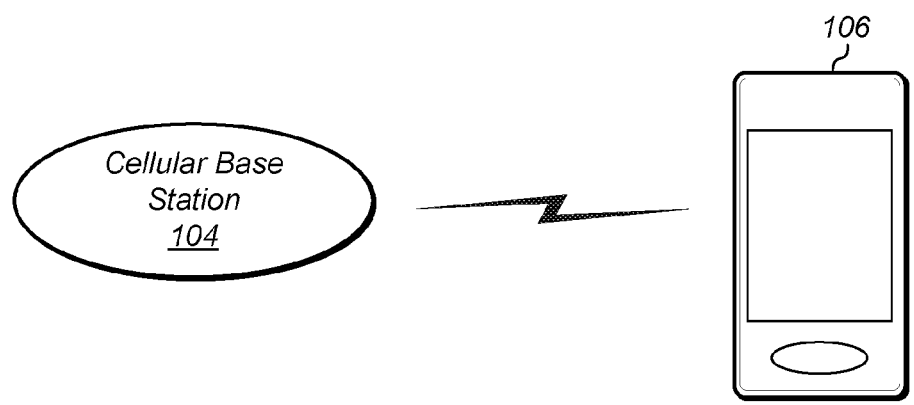
FIG. 2 illustrates a base station (BS) in communication with a user equipment (UE) device, according to one embodiment.

FIGS. 1-2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes an access point 102 which communicates over a transmission medium with one or more user devices 106A, 106B, etc., 106N. Each of the user devices may be referred to herein as a "user equipment" (UE). Thus, the user devices are referred to as UEs or UE devices.

The access point 102 may be an access point providing a wireless local area network (WLAN). The access point 102 may be equipped to communicate with a network 100 (e.g., a wide area network (WAN), such as the Internet, among various possibilities). Thus, the access point 102 may facilitate communication between the UEs 106 and/or between the UEs 106 and the network 100. The access point 102 and the UEs 106 may be configured to communicate over the transmission medium using Wi-Fi, including any of various versions of IEEE 802.11 (e.g., a, b, g, n, ac, etc.).

One or more of the UEs 106 (e.g., UE 106A) may also be configured to communicate with a base station 104. The base station 104 may be a base transceiver station (BTS) or cell site (a "cellular base station"), and may include hardware that enables wireless communication with UEs 106 according to one or more cellular communication protocols. The UE 106 and the cellular base station 104 may communicate using any of various cellular communication technologies such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), etc.

As shown, the cellular base station may be equipped to communicate with a network 108 (e.g., a core network of a cellular service provider, a telecommunication network such as a public switched telephone network (PSTN), and/or the Internet, among various possibilities). Thus, the base station 104 may facilitate communication between UEs 106 and/or between the UEs 106 and the network 108. In particular, the cellular base station 104 may provide UEs 106 with various telecommunication capabilities, such as voice, SMS, and/or data services.

In some cases cellular operators may implement traffic offloading and interworking mechanisms between cellular and WLAN. Using such mechanisms, cellular network operators may be able to offload part or all of a UE's cellular (e.g., LTE/UMTS) data flows to and from those cellular network operators WLAN access points. Note that in at least some instances (e.g., in order to preserve service continuity), the IP address of the WLAN interface may be the same as used for the cellular connection for cellular/WLAN interworking/offloading scenarios.

Thus, although in some instances cellular base station 104 and access point 102 may provide connections to different networks (e.g., network 108 vs. network 100, as shown), in some instances, cellular base station 104 and access point 102 may provide connections to the same network. For example, access point 102 might be an access point deployed by a cellular service provider to supplement their cellular network and provide the capability to offload some cellular data communications to the access point, and might also provide a connection to network 108, which might be a core network of that cellular service provider.

A UE 106 may be capable of communicating using multiple wireless communication standards. For example, a UE 106 may be configured to communicate using at least one wireless networking protocol (e.g., Wi-Fi) and at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). A UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 106 (e.g., UE device 106A illustrated in FIG. 1) in communication with the cellular base station 104, according to one embodiment. The UE 106 may be a device with wireless network connectivity such as a mobile phone, a hand-held device, a wearable device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
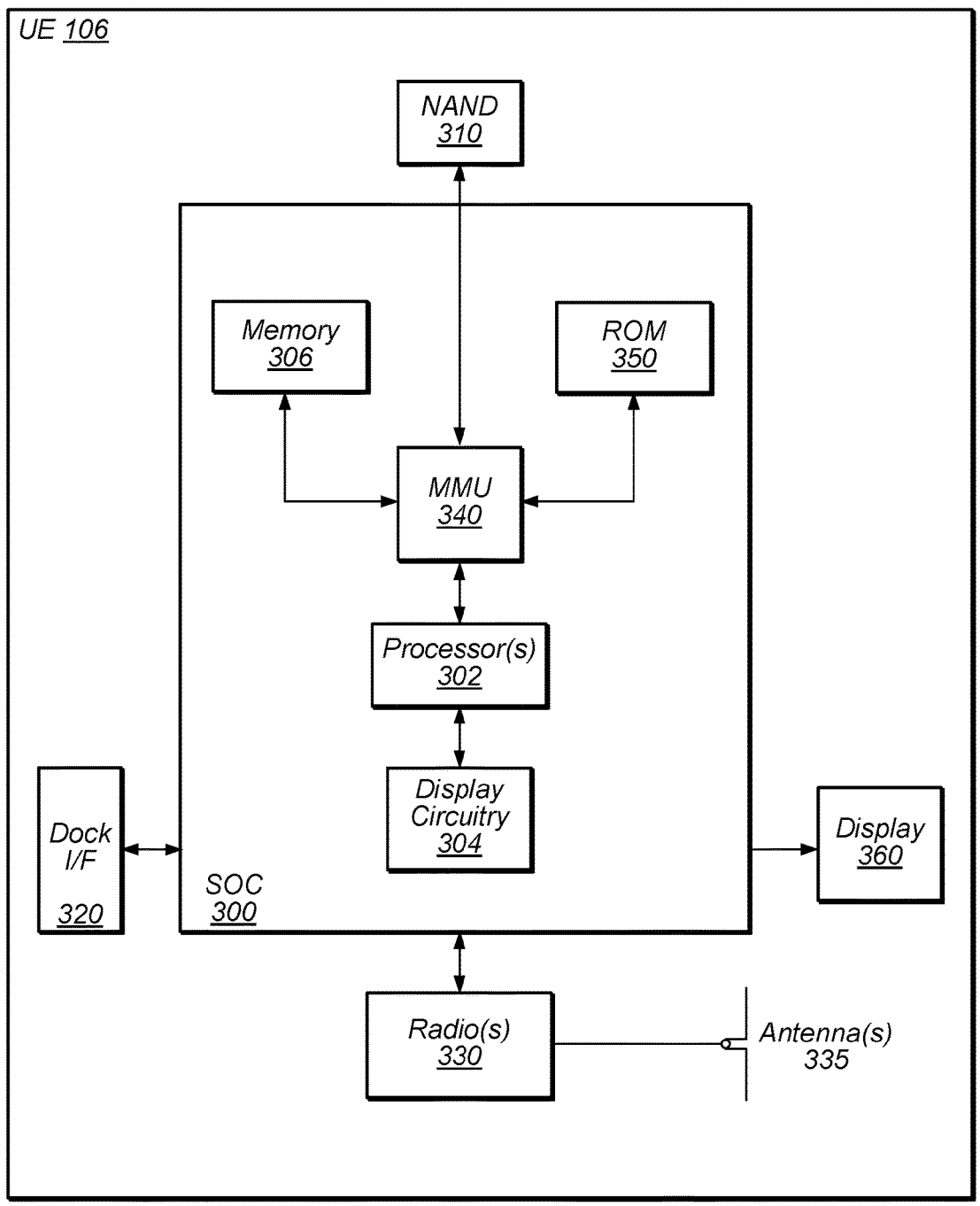
FIG. 3 illustrates an exemplary block diagram of a UE device, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (e.g., including one or more radios), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (or "radio(s)") 330 (e.g., for LTE, LTE-A, CDMA2000, Bluetooth, Wi-Fi, GPS, etc.).

As noted above, the UE 106 may be configured to communicate wirelessly using multiple wireless communication standards. As further noted above, in such instances, the wireless communication circuitry (radio(s)) 330 may include radio components which are shared between multiple wireless communication standards and/or radio components which are configured exclusively for use according to a single wireless communication standard. As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna(s) 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 5:
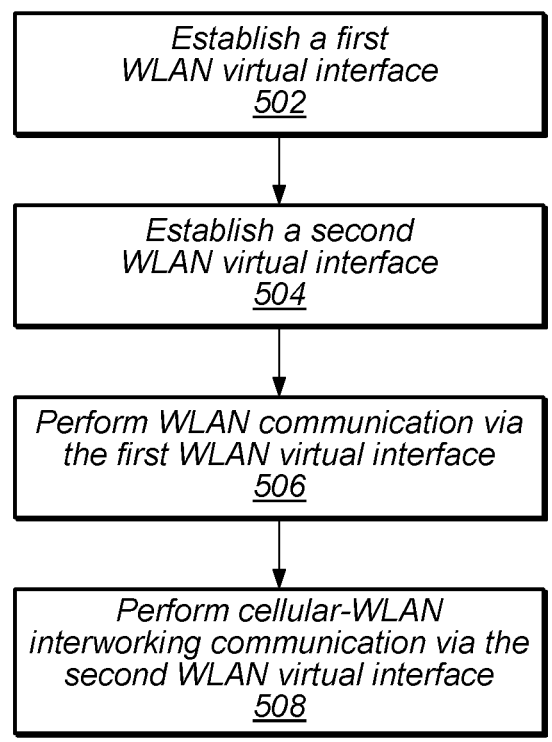
FIG. 5 is a flowchart diagram illustrating an exemplary method for implementing multiple WLAN virtual interfaces for cellular-WLAN interworking in a wireless device, according to one embodiment.

As described herein, the UE 106 may include hardware and software components for implementing features for implementing a virtual WLAN interface for cellular/WLAN interworking, such as those described herein with reference to, inter alia, FIG. 5. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
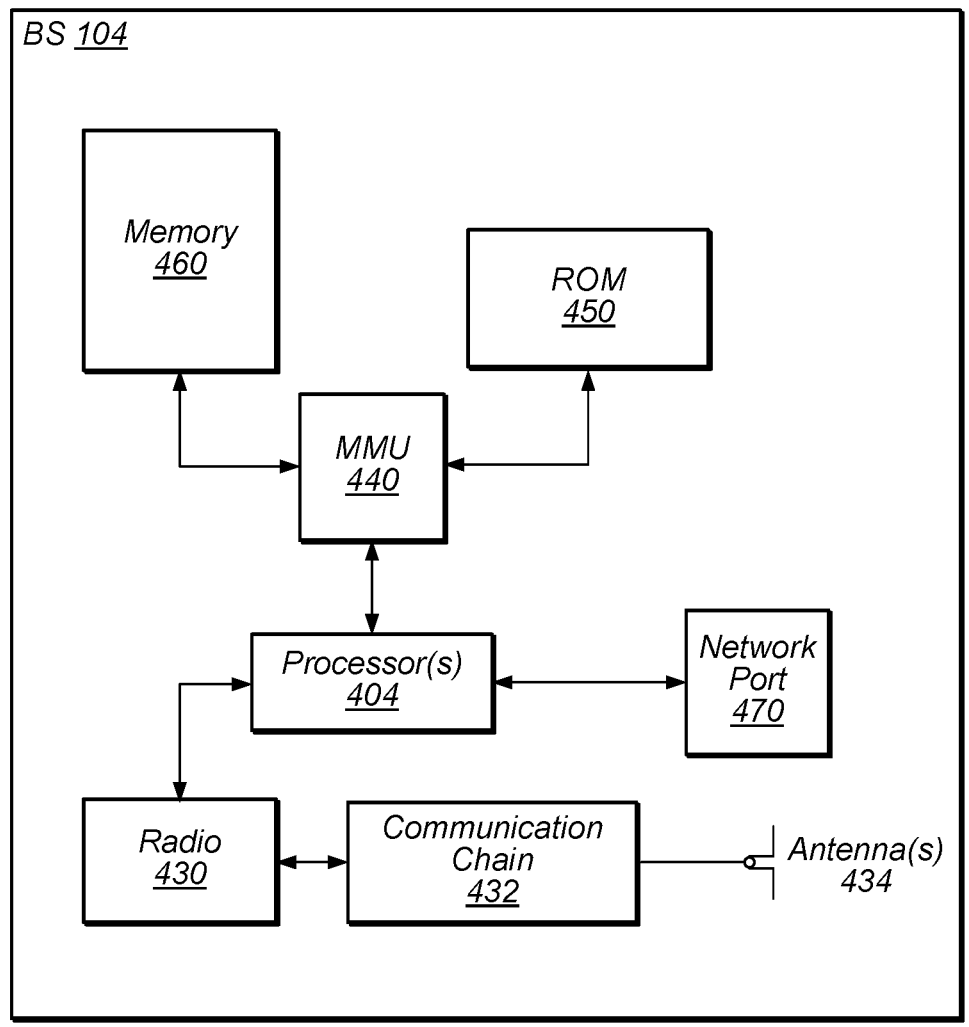
FIG. 4 illustrates an exemplary block diagram of a BS, according to one embodiment.

FIG. 4—Exemplary Block Diagram of a Base Station

FIG. 4 illustrates an exemplary block diagram of a cellular base station (BS) 104, according to one embodiment. It is noted that the base station of FIG. 4 is merely one example of a possible base station. As shown, the base station 104 may include processor(s) 404 which may execute program instructions for the base station 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 104 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 104 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The base station 104 may be configured to support implementation of a virtual WLAN interface for cellular/WLAN interworking by a wireless device. In particular, as described further subsequently herein, the BS 104 may include hardware and software components for implementing (or for use in conjunction with a UE 106 implementing) part or all of a method for a UE 106 to implement a virtual WLAN interface for cellular-WLAN interworking.

The processor 404 of the base station 104 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

As previously noted, certain embodiments of the present disclosure relate to a method for a UE device to implement a virtual WLAN interface for cellular-WLAN interworking. FIG. 5 is a flowchart diagram illustrating such a method. The method shown in FIG. 5 may be used in conjunction with any of the computer systems or devices shown in the above Figures, among other devices. If desired, it may be the case that the method is more particularly implemented by a WLAN/Wi-Fi chipset within a UE device. Some of the method elements shown may be performed concurrently, in a different order than shown, or may be omitted. Additional method elements may also be performed as desired. As shown, the method may operate as follows.

In 502, a first WLAN virtual interface may be established between a WLAN chipset and an application processor of a wireless device. The first WLAN virtual interface may provide an interface between the WLAN chipset and a WLAN connectivity manager executing on the application processor.

In 504, a second WLAN virtual interface may be established between the WLAN chipset and the application processor of the wireless device. The second WLAN virtual interface may provide an interface between the WLAN chipset and a cellular connectivity manager executing on the application processor.

In 506, WLAN communication may be performed with a first access point via the first WLAN virtual interface. The first WLAN virtual interface may utilize a first IP address to perform the WLAN communication with the first access point.

In 508, cellular-WLAN interworking communication may be performed with a second access point via the second WLAN virtual interface. The second WLAN virtual interface may utilize a second IP address to perform the cellular-WLAN interworking communication with the second access point. The second IP address may also be used by the wireless device to perform cellular communication.

The WLAN chipset may include one radio-frequency (RF) chain for performing WLAN communication, or may include multiple RF chains for performing WLAN communication.

If the WLAN chipset includes multiple RF chains, the WLAN communication with the first access point via the first WLAN virtual interface may be performed using a first RF chain of the WLAN chipset, while the cellular-WLAN interworking communication with the second access point via the second WLAN virtual interface may be performed using a second RF chain of the WLAN chipset. In such a case, it may be possible that the WLAN communication with the first access point via the first WLAN virtual interface and the cellular-WLAN interworking communication with the second access point via the second WLAN virtual interface are performed simultaneously.

If the WLAN chipset includes just one RF chain (or possibly even if the WLAN chipset includes multiple RF chains), the WLAN communication with the first access point via the first WLAN virtual interface and the cellular-WLAN interworking communication with the second access point via the second WLAN virtual interface may be performed using a shared RF chain (or multiple shared RF chains) in a time-sharing manner.

In some instances, the WLAN chipset may include (or be coupled to) multiple bidirectional MIMO antennas. In such a case, if only one virtual interface is active at a given time, it may use some or all of the multiple bidirectional MIMO antennas. If both virtual interfaces are active at a given time, however, each virtual interface may be provided with some of the bidirectional MIMO antennas. The antennas may be assigned (divided) such that each virtual interface has controls at least one antenna, or may be time-shared such that each virtual interface controls all of the antennas at alternating times, or may be assigned in any of various other possible ways.

Thus, the method of FIG. 5 may be used to provide separate virtual WLAN interfaces for cellular-WLAN interworking communication and other (e.g., default) WLAN communication. Such a technique may be used to enable cellular-WLAN interworking communication and other WLAN communication to be performed by a wireless device in a non-conflicting manner, and to share use of the WLAN chipset of the wireless device in a manner that may not require user intervention.

Figure 6:
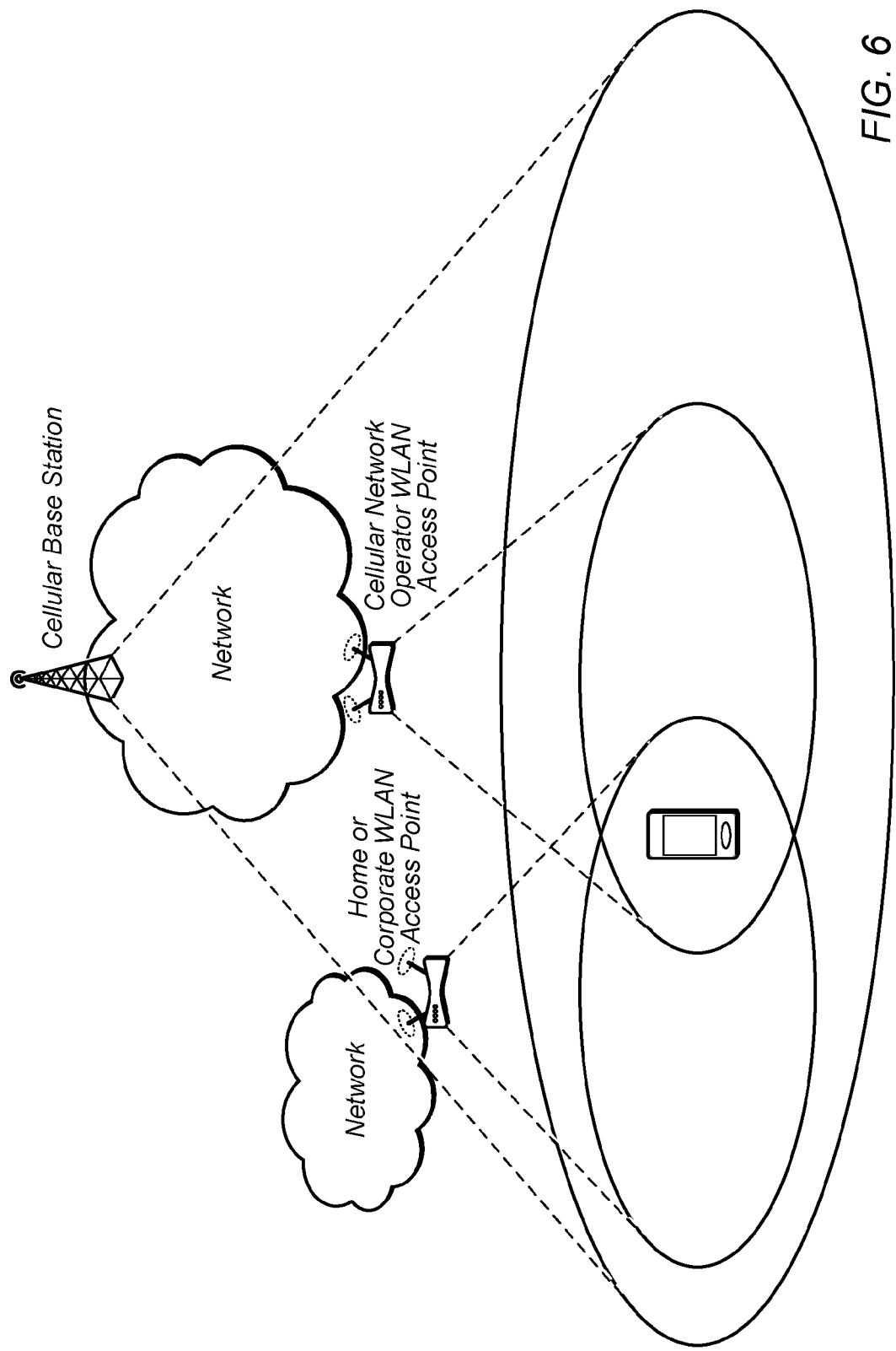
FIG. 6 illustrates an exemplary system in which cellular-WLAN interworking could be implemented, according to one embodiment.

FIG. 6—Wireless Communication System

FIG. 6 illustrates a further exemplary wireless communication system, in which features of the present disclosure may be implemented. Note that FIG. 6 and the description thereof are provided by way of example of one possible wireless communication system, and are not intended to be limiting to the disclosure as a whole. Numerous alternatives to and variations of the details provided hereinbelow are possible and should be considered within the scope of the present disclosure.

More particularly, FIG. 6 illustrates a wireless communication system in which a wireless device is within communication range of (or "covered" by) two WLAN access points as well as a cellular base station.

As shown, the cellular base station may operate according to a 3GPP standard, such as LTE or UMTS. One of the WLAN access points may be an access point deployed by the same 3GPP network operator which operates the cellular base station. Such an access point may be configured for cellular-WLAN interworking, may be connected to the same network (e.g., the core network of the 3GPP network operator) as the cellular base station, and may be used by the 3GPP network operator for offloading some cellular data communications.

As also shown, there may be another WLAN access point in addition to the 3GPP operator WLAN access point, which may be a home or corporate WLAN access point, among various possibilities. The home or corporate WLAN access point may provide typical WLAN communication services, and may provide a connection to a different network than the 3GPP operator's WLAN access point. For example, the "home or corporate" WLAN access point may provide a connection to a personal network, a corporate network (possibly via VPN session), a third party network, the Internet (e.g., by way of an internet service provider), etc.

In many cases, a wireless device may be able to use a cellular data connection (e.g., using an LTE/UMTS/GSM modem) simultaneously with using its WLAN connection (e.g., using a WLAN chipset). For example, a UE at home, in an office, or otherwise in a location having Wi-Fi coverage may be able to use its WLAN connection to establish a data session to a personal or corporate network (e.g., potentially including a VPN session), while concurrently establishing a packet data network connection over LTE or UMTS to a cellular network.

If there is overlap between a home/corporate/etc. WLAN access point and a cellular network operator access point, there is potential for conflict between cellular-WLAN interworking use of the UE's WLAN communication capability and other WLAN communication by the UE in such a situation. For example, if the cellular network or the UE determines to offload part of its cellular traffic to WLAN, but the WLAN is already in use to communicate with a home/corporate/etc. WLAN access point, and there is only one WLAN interface between the application processor and the WLAN chipset of the UE, this has the potential to force a decision regarding whether to disconnect an ongoing WLAN session to use the WLAN interface for cellular offloading, or to reject the cellular offload request and continue the ongoing WLAN session. Similarly, if the cellular offload onto the WLAN interface is initiated at a time when there is no other active WLAN session, but a user later tries to establish a WLAN connection to a home/corporate/etc. WLAN access point, a conflict could occur regarding whether to disconnect the cellular offload onto WLAN to use the WLAN interface to connect to the home/corporate/etc. WLAN access point, or to reject the request to establish a WLAN connection to the home/corporate/etc. WLAN access point and continue the ongoing cellular offload WLAN session.

However, if multiple virtual WLAN interfaces are established (e.g., such as according to the method of FIG. 5), such a conflict may be avoided, and cellular offloading to WLAN may be accomplished in a manner which (at least in some instances) is efficient, reliable, and transparent to the user of a wireless device.

Figure 7:
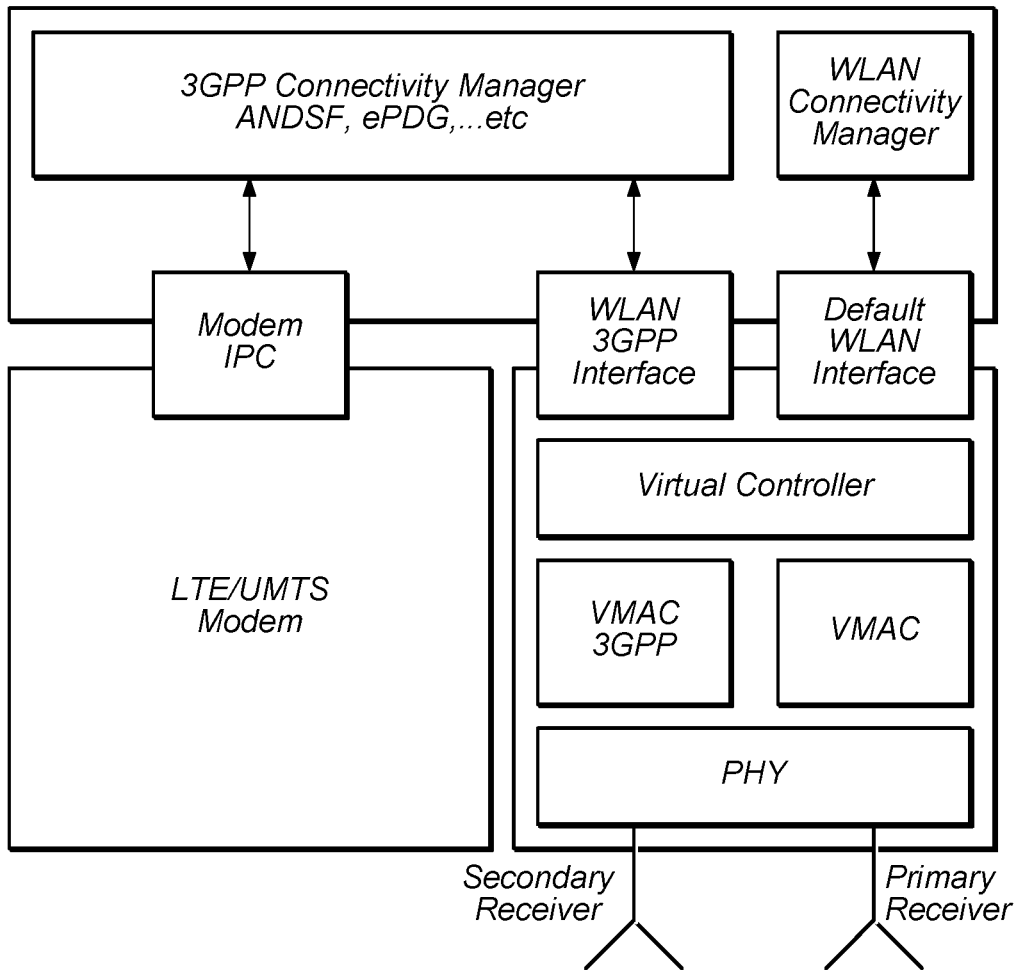
FIG. 7 illustrates an exemplary dual WLAN transceiver architecture of a wireless device, according to one embodiment.
Figure 8:
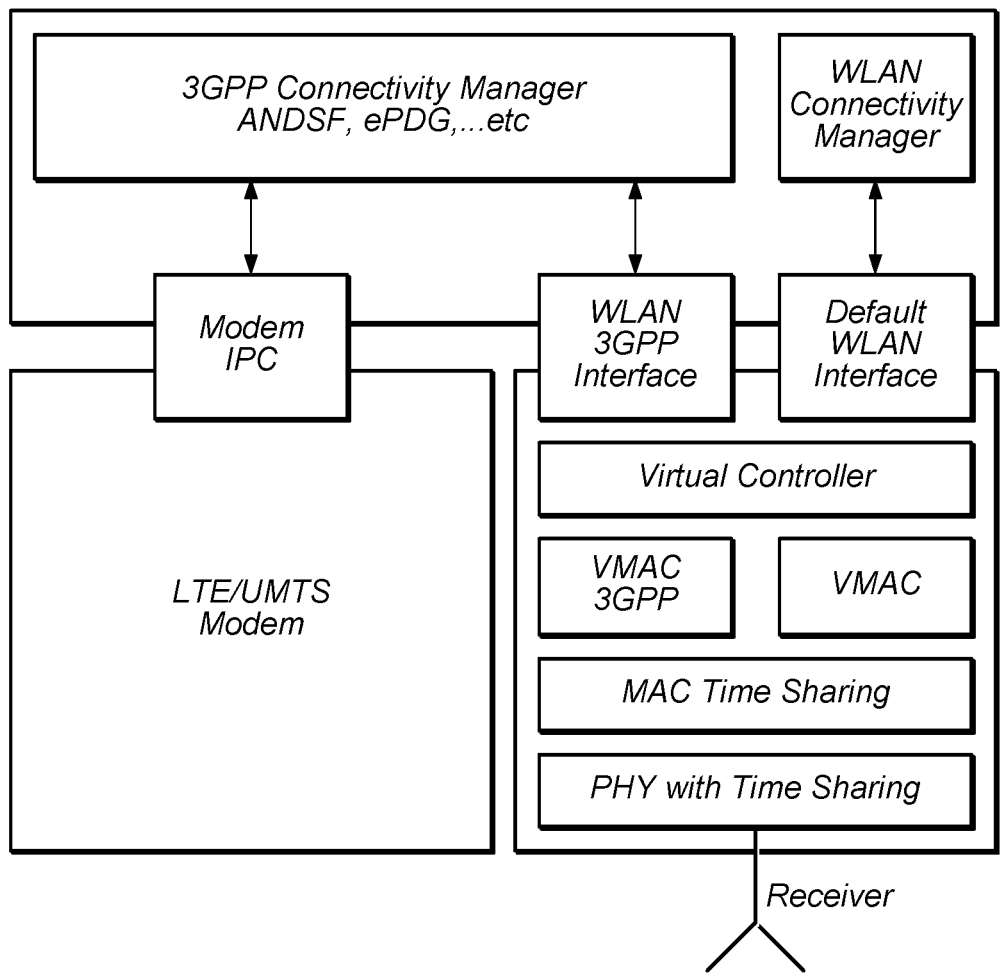
FIG. 8 illustrates an exemplary single WLAN transceiver architecture of a wireless device, according to one embodiment.

FIGS. 7-8—Exemplary Wireless Device Architecture Diagrams

FIGS. 7-8 illustrate exemplary architectures of a wireless device which may be used to implement aspects of the present disclosure. Note that FIGS. 7-8 and the description thereof are provided by way of example of one possible wireless communication system, and are not intended to be limiting to the disclosure as a whole. Numerous alternatives to and variations of the details provided hereinbelow are possible and should be considered within the scope of the present disclosure.

As shown, FIG. 7 illustrates an exemplary dual WLAN transceiver architecture of a wireless device. Thus, the WLAN chipset of the wireless device may include a primary receiver and a secondary receiver. The WLAN chipset may include various protocol stack layers, including a physical (PHY) layer, virtual media access control (virtual MAC or VMAC) layers for each of a cellular-WLAN interworking WLAN interface and a "default" WLAN interface, a virtual controller, and WLAN virtual interfaces for each of cellular-WLAN interworking and "default" WLAN connections.

As further shown, the "default" WLAN interface or "WLAN_DEFAULT" interface may provide an interface between the WLAN chipset and a WLAN connectivity manager entity executing on the application processor of the wireless device. The cellular WLAN interface or "WLAN_3GPP" interface may provide an interface between the WLAN chipset and a cellular (e.g., 3GPP) connectivity manager entity executing on the application processor of the wireless device. The WLAN virtual interfaces may be internet protocol connection (IPC) interfaces.

The cellular connectivity manager may manage cellular connectivity both using the WLAN chipset (e.g., by way of the WLAN_3GPP interface) and a cellular (e.g., 3GPP LTE/UMTS) modem, to which it may be connected by way of a modem IPC interface. The cellular connectivity manager may utilize any of various tools/layers to manage cellular connectivity, including but not limited to an access network discovery and selection function (ANDSF), an enhanced packet data gateway (ePDG), etc.

Note that it may be possible for both WLAN virtual interfaces illustrated to be used in S2A/S2B modes, and for each to be assigned an IP address. Thus (e.g., as previously noted), the WLAN_3GPP interface may have the same IP address as the LTE/UMTS cellular connection (e.g., in order to preserve service continuity). The WLAN_DEFAULT interface may have a different IP address from WLAN_3GPP, and may be connected to a different subnetwork (e.g., intranet or internet). Each WLAN virtual interface can be in S2A/S2B mode with separate data paths.

Note that the WLAN chipset may be able to support use of a single RF transceiver or dual RF transceivers for WiFi at any given time. In some implementations, the WLAN virtual interface may be disabled by default, and the WLAN chipset may use a single RF transceiver. In such a default scenario, the WLAN chipset may, for example, be used by the user to access non cellular network operator access points (e.g., with VPN support and IP address assignment).

When a cellular network sends an offload command, the RRC state machine may perform an offload decision, or the cellular connectivity manager may use ANDSF to perform WLAN reselection/offload. The cellular connectivity manager executing on the application processor may then enable the WLAN_3GPP virtual interface.

If the WLAN default interface is already in use, the second RF transceiver may be powered on and a virtual path may be loaded in the WiFi chipset. Note that the WLAN_3GPP interface may be used in S2A/S2B mode and may (at least in some instances) be strictly used for 3GPP offloading purpose.

If the default interface is not in use, the WLAN_default interface may be disabled and the second RF receiver may be disabled (e.g., to conserve battery). However, if a user triggers a WLAN connection to a non cellular WLAN Access Point, the WLAN connectivity manager executing on the application processor may enable the WLAN default interface. If the WLAN_3GPP virtual interface is in use, the UE may not disable this interface (e.g., to avoid interrupting cellular-WLAN interworking/cellular offloading). Instead, for example, a secondary transceiver may be enabled to attach to this non cellular WLAN access point.

As shown, FIG. 8 illustrates an exemplary single WLAN transceiver architecture of a wireless device. Thus, the WLAN chipset of the wireless device may include just one transceiver. The WLAN chipset may include various protocol stack layers, including a PHY layer, a MAC layer, VMAC layers for each of a cellular-WLAN interworking WLAN interface and a "default" WLAN interface, a virtual controller, and WLAN virtual interfaces for each of cellular-WLAN interworking and "default" WLAN connections.

As further shown, the "default" WLAN interface or "WLAN_DEFAULT" interface may provide an interface between the WLAN chipset and a WLAN connectivity manager entity executing on the application processor of the wireless device. The cellular WLAN interface or "WLAN_3GPP" interface may provide an interface between the WLAN chipset and a cellular (e.g., 3GPP) connectivity manager entity executing on the application processor of the wireless device. The WLAN virtual interfaces may be internet protocol connection (IPC) interfaces.

The cellular connectivity manager may manage cellular connectivity both using the WLAN chipset (e.g., by way of the WLAN_3GPP interface) and a cellular (e.g., 3GPP LTE/UMTS) modem, to which it may be connected by way of a modem IPC interface. The cellular connectivity manager may utilize any of various tools/layers to manage cellular connectivity, including but not limited to an access network discovery and selection function (ANDSF), an enhanced packet data gateway (ePDG), etc.

Note that it may be possible for both WLAN virtual interfaces illustrated to be used in S2A/S2B modes, and for each to be assigned an IP address. Thus (e.g., as previously noted), the WLAN_3GPP interface may have the same IP address as the LTE/UMTS cellular connection (e.g., in order to preserve service continuity). The WLAN_DEFAULT interface may have a different IP address from WLAN_3GPP, and may be connected to a different subnetwork (e.g., intranet or internet). Each WLAN virtual interface can be in S2A/S2B mode with separate data paths.

Whereas according to the wireless device architecture illustrated in FIG. 7, the WLAN chipset may be able to support use of a single RF transceiver or dual RF transceivers for WiFi at any given time, according to the wireless device architecture illustrated in FIG. 8, the WLAN chipset may have only a single RF transceiver. Accordingly, the WLAN chipset may attach to the access points and multiplex uplink and downlink data between the two access points using the single RF transceiver in a time sharing manner.

For example, when a cellular network sends an offload command, the RRC state machine may perform an offload decision, or the cellular connectivity manager may use ANDSF to perform WLAN reselection/offload. The cellular connectivity manager executing on the application processor may then enable the WLAN_3GPP virtual interface.

If the WLAN default interface is already in use, one or more time sharing algorithms may be enabled in the MAC/PHY layers between user WLAN access points and the cellular operator access point. Note that the WLAN_3GPP interface may be used in S2A/S2B mode and may (at least in some instances) be strictly used for 3GPP offloading purpose.

If the default interface is not in use, the WLAN_default interface may be disabled and the time sharing may also be disabled (e.g., in the WLAN MAC/PHY layers). However, if a user triggers a WLAN connection to a non cellular WLAN access point, the WLAN connectivity manager executing on the application processor may enable the WLAN default interface. If the WLAN_3GPP virtual interface is in use, the UE may not disable this interface (e.g., to avoid interrupting cellular-WLAN interworking/cellular offloading). Instead, for example, one or more time sharing algorithms between user WLAN access points and a cellular network operator's access point may be enabled (e.g., in the MAC/PHY layers).

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment device (UE), comprising:
a wireless local area network (WLAN) radio;
a cellular radio; and
wherein the UE is configured to:
  establish, using the WLAN radio, a first internet protocol connection (IPC) interface associated with a first internet protocol (IP) address;
  perform, via the WLAN radio, WLAN communication for one or more first data flows with a first access point using the first IPC interface;
  establish, using the cellular radio, a second IPC interface for one or more second data flows associated with a second IP address;
  perform, via the cellular radio, cellular communication for the one or more second data flows with a base station of a cellular network using the second IPC interface;
  receive an indication from the base station to offload to a second access point, wherein the second access point is a WLAN access point;
  and
  perform, via the WLAN radio and in response to receiving an indication from the base station to offload to the second access point, cellular-WLAN interworking communication with the second access point using the second IPC interface for at least one of the one or more second data flows, wherein the WLAN communication using the respective first IPC interface and the cellular-WLAN interworking communication using the respective second IPC interface are performed concurrently.

2. The UE of claim 1,
wherein the second IPC interface uses the second IP address for the cellular communication and the cellular-WLAN interworking communication for the at least one of the one or more traffic flows.

3. The UE of claim 1,
wherein a radio resource control (RRC) state machine at the UE performs an offload decision when the UE receives the indication to offload.

4. The UE of claim 1,
wherein the UE uses access network discovery and selection function (ANDSF) to perform WLAN reselection or the offloading.

5. The UE of claim 1,
wherein the WLAN radio comprises a plurality of radio frequency (RF) chains;
wherein the WLAN communication with the first access point via the first IPC interface is performed using a first RF chain of the plurality of RF chains;
wherein the cellular-WLAN interworking communication with the second access point via the second IPC interface is performed using a second RF chain of the plurality of RF chains;
wherein the WLAN communication with the first access point via the first IPC interface and the cellular-WLAN interworking communication with the second access point via the second IPC interface are performed simultaneously.

6. The UE of claim 1,
wherein the WLAN communication with the first access point via the first IPC interface and the cellular-WLAN interworking communication with the second access point via the second IPC interface are performed using a shared RF chain in a time-sharing manner if both the first IPC interface and the second IPC interface are active at a given time.

7. The UE of claim 1,
wherein the second access point is a 3$^{rd}$ Generation Partnership Project (3GPP) network operator access point configured for cellular-WLAN interworking and offloading.

8. A method comprising:
by a wireless device comprising a wireless local area network (WLAN) radio and a cellular radio:
establishing, using the WLAN radio, a first internet protocol connection (IPC) interface associated with a first internet protocol (IP) address;
performing, via the WLAN radio, WLAN communication for one or more first data flows with a first access point using the first IPC interface;
establishing, using the cellular radio, a second IPC interface for one or more second data flows associated with a second IP address;
performing, via the cellular radio, cellular communication for the one or more second data flows with a base station of a cellular network using the second IPC interface;
receiving an indication from the base station to offload to a second access point, wherein the second access point is a WLAN access point; and
performing, via the WLAN radio and in response to receiving an indication from the base station to offload to the second access point, cellular-WLAN interworking communication with the second access point using the second IPC interface for at least one of the one or more second data flows, wherein the WLAN communication using the respective first IPC interface and the cellular-WLAN interworking communication using the respective second IPC interface are performed concurrently.

9. The method of claim 8,
wherein the second IPC interface uses the second IP address for the cellular communication and the cellular-WLAN interworking communication for the at least one of the one or more traffic flows.

10. The method of claim 8,
wherein a radio resource control (RRC) state machine at the UE performs an offload decision when the UE receives the indication to offload.

11. The method of claim 8,
wherein the UE uses access network discovery and selection function (ANDSF) to perform WLAN reselection or the offloading.

12. The method of claim 8,
wherein the WLAN radio comprises a plurality of radio frequency (RF) chains;
wherein the WLAN communication with the first access point via the first IPC interface is performed using a first RF chain of the plurality of RF chains;
wherein the cellular-WLAN interworking communication with the second access point via the second IPC interface is performed using a second RF chain of the plurality of RF chains;
wherein the WLAN communication with the first access point via the first IPC interface and the cellular-WLAN interworking communication with the second access point via the second IPC interface are performed simultaneously.

13. The method of claim 8,
wherein the WLAN communication with the first access point via the first IPC interface and the cellular-WLAN interworking communication with the second access point via the second IPC interface are performed using a shared RF chain in a time-sharing manner if both the first IPC interface and the second IPC interface are active at a given time.

14. The method of claim 8,
wherein the second access point is a 3$^{rd}$ Generation Partnership Project (3GPP) network operator access point configured for cellular-WLAN interworking and offloading.

15. An apparatus, comprising:
a wireless local area network (WLAN) radio;
a cellular radio; and
wherein the apparatus is configured to:
establish, using the WLAN radio, a first internet protocol connection (IPC) interface associated with a first internet protocol (IP) address;
perform, via the WLAN radio, WLAN communication for one or more first data flows with a first access point using the first IPC interface;
establish, using the cellular radio, a second IPC interface for one or more second data flows associated with a second IP address;
perform, via the cellular radio, cellular communication for the one or more second data flows with a base station of a cellular network using the second IPC interface;
receive an indication from the base station to offload to a second access point, wherein the second access point is a WLAN access point; and
perform, via the WLAN radio and in response to receiving an indication from the base station to offload to the second access point, cellular-WLAN interworking communication with the second access point using the second IPC interface for at least one of the one or more second data flows, wherein the WLAN communication using the respective first IPC interface and the cellular-WLAN interworking communication using the respective second IPC interface are performed concurrently.

16. The apparatus of claim 15,
wherein the second IPC interface uses the second IP address for the cellular communication and the cellular-WLAN interworking communication for the at least one of the one or more traffic flows.

17. The apparatus of claim 15,
wherein a radio resource control (RRC) state machine at the UE performs an offload decision when the UE receives the indication to offload.

18. The apparatus of claim 15,
wherein the UE uses access network discovery and selection function (ANDSF) to perform WLAN reselection or the offloading.

19. The apparatus of claim 15,
wherein the WLAN radio comprises a plurality of radio frequency (RF) chains;
wherein the WLAN communication with the first access point via the first IPC interface is performed using a first RF chain of the plurality of RF chains;
wherein the cellular-WLAN interworking communication with the second access point via the second IPC interface is performed using a second RF chain of the plurality of RF chains;
wherein the WLAN communication with the first access point via the first IPC interface and the cellular-WLAN interworking communication with the second access point via the second IPC interface are performed simultaneously.

20. The apparatus of claim 15,
wherein the WLAN communication with the first access point via the first IPC interface and the cellular-WLAN interworking communication with the second access point via the second IPC interface are performed using a shared RF chain in a time-sharing manner if both the first IPC interface and the second IPC interface are active at a given time.

\* \* \* \* \*